March 1, 1960 K. W. CATTERMOLE 2,927,162

ELECTRIC PULSE COMMUNICATION SYSTEMS

Filed Aug. 10, 1954

Inventor
K. W. CATTERMOLE
By Philip M. Bolton
Attorney

United States Patent Office 2,927,162
Patented Mar. 1, 1960

2,927,162

ELECTRIC PULSE COMMUNICATION SYSTEMS

Kenneth William Cattermole, London, England, assignor to International Standard Electric Corporation, New York, N.Y., a corporation of Delaware Application August 10, 1954, Serial No. 448,982

Claims priority, application Great Britain September 24, 1953

5 Claims. (Cl. 179—15)

The present invention relates to electric pulse distributors, particulary to distributors used for multichannel electric pulse communication systems.

The principal object of the invention is to provide distributor circuit arrangements in which crystal triode amplifiers can be satisfactorily used, though other amplifiers (for example, thermionic valves) could also be used in these arrangements.

When selecting distributor arrangements suitable for use with crystal triodes, two special properties of crystal triodes have to be taken into account. First, the input impedance is relatively low, though not so low that it can be regarded as zero. Second, the frequency at which crystal triodes can operate satisfactorily is limited.

The relatively low input impedance causes any arrangement depending on a delay network distributor to be impracticable because the delay network will be too heavily loaded by crystal triode circuits connected to the respective tapping points, as in the conventional arrangements employing thermionic valves. The alternative is a number of crystal triodes arranged to form some sort of counting circuit controlled by a timing pulse generator. The preferred arrangement is a ring of counting stages each of which is operated in turn. In the usual form of such a counting ring, each stage comprises a two-condition device of some kind having two stable "on" and "off" conditions, and the stages are triggered in turn from the "off" condition to the "on" condition, and each stage on being triggered switches off the previous stage.

When a crystal triode is used as the two-condition device, it has been found that it operates more quickly if it is arranged to be stable only in the "off" condition. This means that the conventional arrangement of the counting ring is not suitable for high speed operation if crystal triode counting stages are used.

According to the invention, an electric pulse distributor circuit comprises a plurality of similar counting stages arranged in a ring, each stage consisting of a normally blocked monostable two-condition trigger device arranged to generate an output pulse on being triggered, means for supplying a train of timing pulses simultaneously to all the stages in such manner that any stage is triggered by a timing pulse when it is unblocked, means for delaying the output pulse generated by each stage, and means for applying the delayed output pulse to unblock the next succeeding stage of the ring to enable it to be triggered by a timing pulse.

The invention also provides a multichannel electric pulse communication system employing the distributor circuit just specified.

Figure 2:
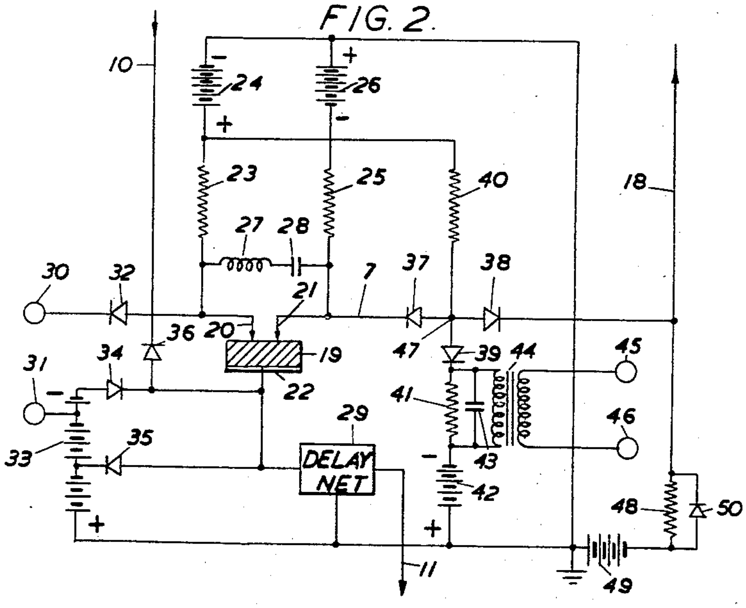
Figure 1:
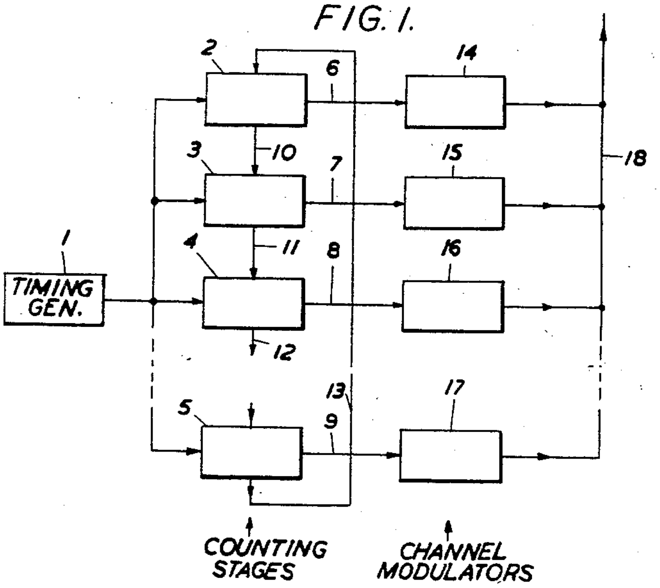

The invention will be described with reference to the accompanying drawing, in which:

Fig. 1 shows a block schematic circuit diagram of a transmitter terminal of a multichannel electric pulse communication system employing a distributor circuit according to the invention; and Fig. 2 shows a detailed schematic circuit diagram of two of the elements of Fig. 1.

The distributor circuit forming part of the transmitting terminal shown in Fig. 1 comprises a master timing pulse generator 1 which supplies a train of short regularly repeated substantially rectangular timing pulses to any number $n$ of counting stages of which only the first three and the last are shown, and are designated 2, 3, 4 and 5. These counting stages are arranged in a ring and each consists of a monostable two-condition device which is normally biased so as to be blocked, but which can be triggered by a timing pulse from the generator 1 if it happens to be unblocked. On being triggered it delivers an output distributor pulse to the corresponding one of the output conductors 6 to 9.

Corresponding to each distributor pulse there is generated by each counting stage an unblocking pulse which is delayed by a little less than one period of the timing pulse train. The delayed unblocking pulse is applied from each counting stage to the next one in the ring, so that after the counting stage has been triggered by a timing pulse, the next counting stage is unblocked in time to be triggered by the next timing pulse, and so on. Thus unblocking pulses are supplied from counting stages 2, 3 and 4 to the next ones over conductors 10, 11, 12. The last counting stage 5 of the series supplies unblocking pulses over conductor 13 to the first counting stage 2.

Since all the counting stages are initially blocked, the counting operation has to be started by applying from any convenient separate source (not shown) an unblocking pulse or potential to one of the stages to enable it to be triggered by the next following timing pulse, after which counting continues indefinitely.

While any suitable monostable two-condition device may be used for each counting stage, the arrangement shown in Fig. 1 is of particular advantage if a crystal triode is used for the two-condition device. Preferably the pulse generator described in Patent No. 2,807,719, granted September 24, 1957, should be used.

The distributor pulses produced by the respective counting stages may be employed in any desired way. For example they may be supplied over conductors 6, 7, 8, 9 to corresponding channel modulators 14, 15, 16, 17 of a multichannel electric pulse communication system. The modulated channel pulses from the outputs of the respective modulators are supplied to a common conductor 18 leading to a radio transmitter (not shown) or other conventional communication means. The channel pulses may be modulated in time position, duration, or amplitude, for example, according to conventional methods.

Fig. 2 shows circuit details of the preferred form of elements 3 and 15 of Fig. 1 for a multichannel pulse system employing amplitude modulation of the channel pulses. The other pairs of corresponding elements of Fig. 1 may be similar.

In Fig. 2, a crystal triode 19, having emitter and collector electrodes 20 and 21 and a base electrode 22 is arranged as a trigger device in substantially the same way as shown in Patent 2,807,719 already referred to. The emitter electrode 20 is connected through a load resistor 23 to a grounded positive polarising source 24, and the collector electrode 21 is connected through a second load resistor 25 to a grounded negative polarising source 26. The collector and emitter electrodes are connected together by a series resonant circuit consisting of an inductor 27 and a capacitor 28.

The base electrode 22 is connected to ground through the input circuit of a delay network 29. The output circuit of the delay network is connected to the output conductor 11 which leads to the next counting stage 4 shown in Fig. 1, but not shown in Fig. 2.

Two input terminals 30, 31 are provided from the timing generator 1 of Fig. 1 (not shown in Fig. 2). Terminal 30 is connected through a rectifier 32 to the emitter electrode 20, and terminal 31 is connected to a tapping point on a grounded negative bias source 33, the tapping point providing a bias voltage $V_2$. The base electrode 22 is connected through rectifiers 34 and 35 respectively to two other points on the source 33 providing bias voltages $V_1$ and $V_3$. These bias voltages are so chosen that $V_2$ is less than $V_1$, and greater than $V_3$. Rectifiers 32 and 35 are directed so that if the electrodes of the crystal triode were connected to ground, the rectifiers would be biased in the low resistance direction, while rectifier 34 is connected oppositely to the others. The conductor 10 leading from counting stage 2 (Fig. 1) is connected to the base electrode 22 through a rectifier 36 directed to pass negative pulses to the base electrode.

When the timing pulse generator is connected to terminals 30 and 31, and assuming that there is a direct current path through its output circuit, then it will be seen that the base electrode is held at a negative potential of $V_3$ through the rectifier 35 while the emitter electrode 20 is held at a negative potential of $V_2$ through rectifier 32. Since $V_2$ is greater than $V_3$ the emitter electrode 20 is biased negatively with respect to the base electrode 22 and so the crystal triode is blocked. Let the timing generator supply short pulses of amplitude $v$ of such sign that terminal 30 is made positive to terminal 31. So long as $v$ is less than $V_2-V_3$ the timing pulses will be unable to unblock the crystal triode.

The preceding counting stage 2 (Fig. 1) supplies a negative unblocking pulse with a peak voltage of $V_4$ over conductor 10, where $V_4$ lies between $V_2$ and $V_3$ and is of such value that $V_2-V_4$ is less than $v$. The next timing pulse is now able to unblock and trigger the crystal triode which then generates a single distributor pulse the duration of which is practically equal to $\pi\sqrt{LC}$ where L is the inductance of the inductor 27 and C is the capacity of the capacitor 28. During the generation of this distributor pulse, the potential of the base electrode falls to $-V_1$ where it is held by the rectifier 34 and then rises again to $-V_3$ where it is held by the rectifier 35. The output distributor pulse is positive-going and is obtained from the collector electrode 21 and is supplied to the output conductor 7. The negative pulse of amplitude $V_1-V_3$ generated by base electrode 22, when its potential changes from $-V_3$ to $-V_1$ and back again to $-V_3$, is applied although the delay network 29 to conductor 11 as the unblocking pulse for the next counting stage, and the attenuation of the delay network should be so chosen that the negative pulse supplied to conductor 11 has an amplitude $V_1-V_4$.

The potential of the collector electrode 21 will always be negative, and will be not much less than the potential of the source 26 when the crystal triode is cut off. When the crystal triode is triggered, the negative potential of the collector electrode will fall to a value a little greater than $V_1$. In practice, the amplitude of the pulse generated by the collector electrode 21 may be perhaps four or five times the amplitude of the pulse generated by the base electrode 22.

In the case of a distributor which was required for a 25 channel pulse communication system (in which one channel is used as a synchronising channel), the timing pulse generator 1 of Fig. 1 was arranged to generate 250,000 timing pulses per second, each having a duration of 0.5 microsecond. This provides a channel separation period of 4 microseconds, and a sampling frequency of 10 kilocycles per second. The resonant circuit 27, 28, Fig. 2 was chosen to produce distributor pulses with a duration of 2 microseconds, and the delay network 29 was designed to introduce a delay of 3 microseconds, so that the next counting stage will be unblocked about 1 microsecond before the arrival of the corresponding timing pulse. The remaining circuit values were as follows:

| | | |
|---|---|---|
| Potential of sources **24** and **26** | volts | 48 |
| Resistor **23** | ohms | 39,000 |
| Resistor **25** | do | 2,200 |
| $V_1$ | volts | 14 |
| $V_2$ | do | 12 |
| $V_3$ | do | 8 |
| $V_4$ | do | 11 |
| $v$ | do | 3 |

It will be understood that the particular circuit values and other data just given can be varied to meet other requirements, and are not essential to the invention. It may be added that although the source 33 has been shown as a separate source for clearness, the necessary bias potentials could, for example, have been derived from the source 26 by a potential divider (not shown).

The remaining elements of Fig. 2 constitute the channel modulator 15 of Fig. 1, and are arranged to produce a train of amplitude modulated pulses. Three rectifiers 37, 38, 39 have like terminals connected to the positive terminal of source 24 through a load resistor 40. Rectifiers 37 and 38 are connected in series between conductor 7 and the common output conductor 18 which is also shown in Fig. 1. Rectifier 39 is connected through a resistor 41 to a grounded negative bias source 42. Resistor 41 is shunted by a small capacitor 43 and by the secondary winding of an input transformer 44, the primary winding of which is connected to a pair of input terminals 45, 46 to which are supplied a modulating signal wave. The potential of the source 42 may be of the order of half the potential of the source 26, for example.

The rectifier 39 is directed so that a current flowing from the source 24 through the resistors 40 and 41 would bias it in the low resistances direction. In the normal condition, when the crystal triode 19 is blocked, and assuming that no potential is applied at terminals 45 and 46, the junction point 47 of the three rectifiers will be more negative than the source 42 and so the rectifier 39 will be blocked. When the crystal triode is triggered, the negative potential applied to conductor 7 becomes reduced until the rectifier 39 conducts and hold the potential of the junction point 47 at a potential $-V_5$ determined by the potentials of the sources 24 and 42 and by the resistances of the resistors 40 and 41, and of the secondary winding of the transformer 44. At this time the rectifier 37 also becomes blocked. The arrangement accordingly limits the amplitude of the pulse at the junction point to $-V_5$. Suppose a signal potential is now applied at terminals 45 and 46. This will produce a current through the resistor 41, and the corresponding potential drop will combine with the potential of the source 42, and will effectively increase or decrease the limiting potential $-V_5$ according to the sign of the applied potential. The pulses at the junction point 47 will accordingly be amplitude modulated in accordance with the signal wave at terminals 45 and 46.

The rectifier 38 is provided as an isolating rectifier to prevent interaction between the various modulators which are shown in Fig. 1 connected to the output conductor 18. In Fig. 2 this conductor is shown connected through a load resistor 48 to a grounded negative bias source 49 the potential of which should be a little less negative than the potential of the point 47 when the crystal triode 19 is blocked. The rectifier 38 will thus be normally blocked, but as soon as the crystal triode is triggered, the negative potential of the point 47 will become much less negative, and the rectifier 38 then conducts and delivers the corresponding pulse to the conductor 18. The rectifiers (not shown) corresponding to 38 in all the other modulators will be held blocked by this pulse and so it will not be diverted into any of them.

The load resistor 48 may be shunted by a rectifier 50 directed to prevent the conductor 18 from acquiring a potential more negative than the source 49. It will be understood that only one set of elements 48, 49, 50 is required, not one for each modulator.

In a particular example of the amplitude modulator shown in Fig. 2 used with an audio frequency signal wave, the resistors 40 and 41 had resistances of 39,000 and 15,000 ohms, respectively; the transformer 44 had an impedance ratio 12,000 ohms to 600 ohms; the capacity of capacitor 43 was 0.0082 microfarad, and the potential of the source 42 was 25 volts.

It will be understood that a distributor circuit according to the invention similar to that shown in Fig. 1 could be used at the receiving terminal of a multichannel pulse communication system for controlling the selection of the received channel pulses, in a manner well known to those skilled in the art.

While the principles of the invention have been described above in connection with specific embodiments, and particular modifications thereof, it is to be clearly understood that this description is made only by way of example and not as a limitation on the scope of the invention.

What I claim is:

1. An electric pulse multichannel communication system having a pulse distributor comprising a plurality of normally blocked crystal triode trigger circuits connected in a ring, each crystal triode having emitter, collector and base electrodes, delay means connected between the base electrodes of successive of said triodes, said trigger circuits each serving to generate an unblocking pulse of specified duration at its base electrode to unblock the next following trigger circuit in said ring over said delay means, and means for applying a train of timing pulses simultaneously between the base and emitter electrodes of all said crystal triodes to trigger any crystal triode which is unblocked, whereby said triodes will be triggered in succession, and a channel output circuit coupled to the collector electrodes of each crystal triode to provide a channel output pulse in response to triggering of the associated triode.

2. A distributor circuit according to claim 1 comprising means for applying a bias potential to the emitter electrode of each crystal triode with respect to the base electrode in such direction as to block the emitter contact, means for applying the timing pulses to the crystal triode with such amplitude and sign as effectively to reduce but not to overcome, the blocking potential applied to the emitter contact, and means for applying the delayed unblocking pulses from the preceding crystal triode in the ring with such amplitude and sign as effectively to reduce the said bias potential sufficiently to enable the timing pulses to overcome the said blocking potential, thereby triggering the crystal triode.

3. A distributor circuit according to claim 1 comprising means for limiting the amplitude of the pulses generated by the base electrode to a specified value.

4. A transmitting terminal according to claim 1 comprising means for modulating the amplitudes of said channel output pulses from each trigger circuit in accordance with a corresponding signal wave.

5. A transmitting terminal according to claim 4 in which the means for modulating includes means for limiting the amplitude of said channel output pulses between two levels, and means for applying the modulating signal wave to vary one of the said levels.

References Cited in the file of this patent

UNITED STATES PATENTS

| | | |
|---|---|---|
| 2,543,736 | Trevor | Feb. 27, 1951 |
| 2,564,692 | Hoeppner | Aug. 21, 1951 |
| 2,594,336 | Mohr | Apr. 29, 1952 |
| 2,614,141 | Edson et al. | Oct. 14, 1952 |
| 2,652,501 | Wilson | Sept. 15, 1953 |
| 2,662,117 | Staal | Dec. 8, 1953 |
| 2,665,845 | Trent | Jan. 12, 1954 |
| 2,764,688 | Grayson et al. | Sept. 25, 1956 |